Aug. 13, 1957     H. M. GEYER     2,802,454
DUAL ACTUATOR

Filed Dec. 8, 1955     2 Sheets-Sheet 1

INVENTOR.
Howard M. Geyer
BY
Craig V. Morton
HIS ATTORNEY

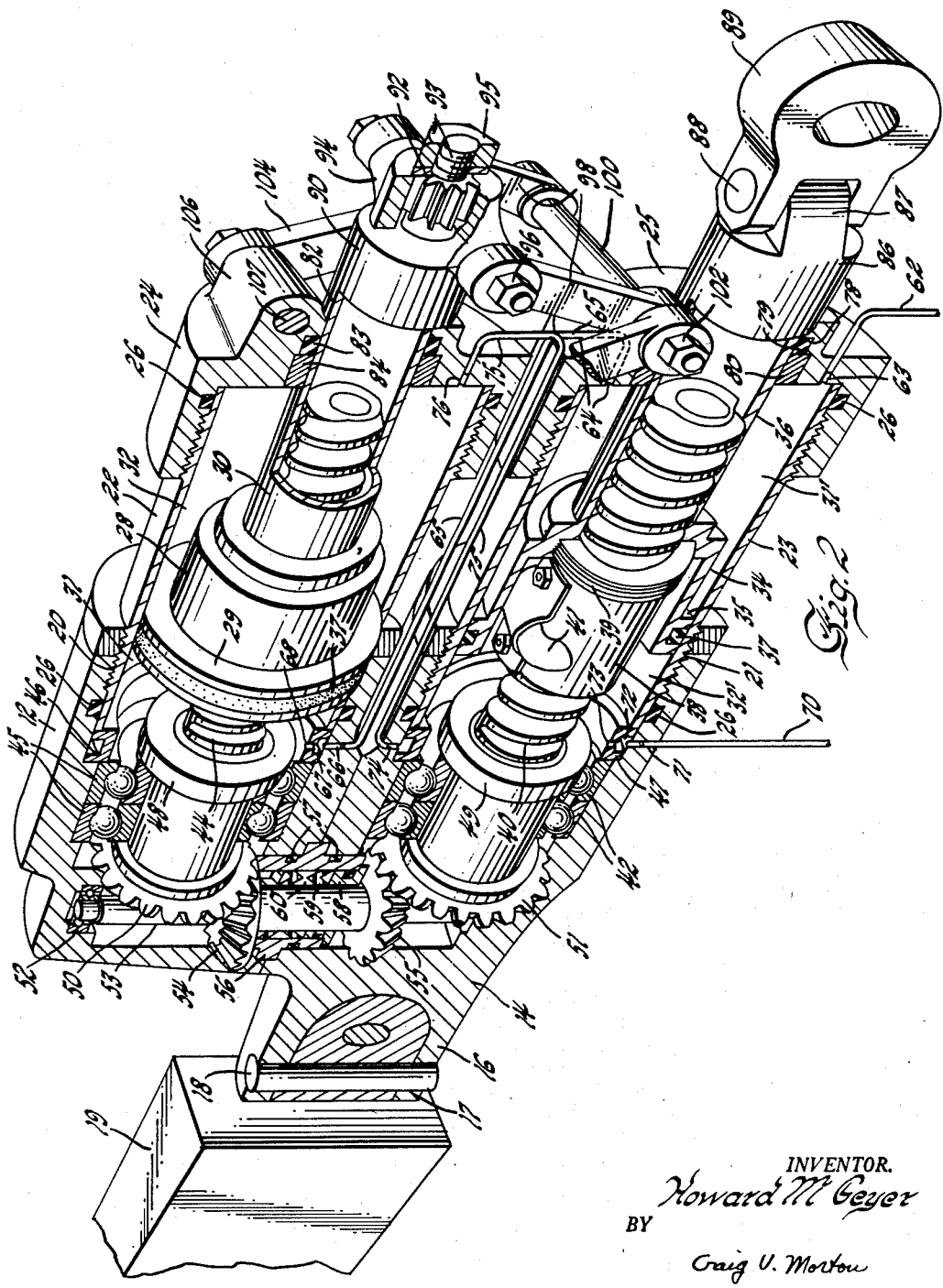

# United States Patent Office 2,802,454
Patented Aug. 13, 1957

2,802,454

DUAL ACTUATOR

Howard M. Geyer, Dayton, Ohio, assignor to General Motors Corporation, Detroit, Mich., a corporation of Delaware Application December 8, 1955, Serial No. 551,822

10 Claims. (Cl. 121—38)

This invention relates to fluid pressure operated actuators, and particularly to a parallel arrangement of dual actuators.

In previous dual actuator assemblies for use in aircraft installations, the advantages of employing two actuators for moving a single control surface are realized together with synchronous movement by rigid interconnection of dual pistons in a single actuator cylinder. In such actuators, as shown, for example, in my copending application, S. N. 474,540, Twin Actuator Assembly, filed December 10, 1954, one of the piston rods is arranged for connection to a fixed support, and the other piston rod is arranged for connection to a movable load device. Thus, one of the pistons is fixed, and the other piston is movable throughout a predetermined stroke, and the cylinder moves throughout half the stroke of the movable piston. In many aircraft installations, however, mounting space limitations preclude the use of such twin actuator assemblies having necessarily movable cylinder structure.

Previous actuators of the type noted also provide only unequal actuating areas on opposite sides of actuator pistons due to interconnecting structure between the pistons. They, therefore, require means for providing various pressures of actuating fluid for opposite directions of actuation.

Due to the space limitations mentioned earlier, the previous means for taking up reaction torque of the actuator through rods to prevent rotation of the movable unitary cylinder assembly cannot be effectively utilized to prevent useless rotation of actuator parts.

An object of the present invention is to provide a parallel arrangement of dual fluid pressure actuators adapted for use in limited mounting space.

Another object is to provide a dual fluid pressure actuator in which the interconnected pistons are so disposed that areas effecting actuation are equal requiring only equal fluid pressure actuation regardless of the direction of movement desired.

Another object is to provide an articulated means or scissor linkage arrangement for taking up reaction torque of the actuator adapted for use in limited mounting space.

The aforementioned and other objects are accomplished in the present invention by an actuator assembly comprising a pair of cylinders having parallel axes. Each cylinder contains a reciprocal piston which is operatively connected through an internally threaded nut to a screw shaft or element rotatably journalled in the cylinder parallel to a similar screw shaft or element in the other cylinder. The screw shafts of the two actuators are interconnected by gearing. The torque of both actuators is added to actuate the load in either direction of actuation because the pistons in the two cylinders can move in opposite directions during actuation. The total combined area of the two pistons is equal in both directions since the rod end of one piston is subjected to fluid pressure while the head end of the other piston is subjected to fluid pressure while the head end of the other piston is subjected to fluid pressure simultaneously. Fluid supply lines are provided so that actuating fluid is supplied simultaneously to the rod end of one piston and head end of the other piston and vice versa. Thus, there is a retract chamber portion and an extend chamber portion comprising combined portions of space on opposite sides of the respective interconnected pistons.

The parallel arrangement of dual fluid pressure actuators just described permits the pair of cylinders, rigidly connected to each other, both to be fixed to a support member. The mounting space required by the fixed cylinders is far less than for previous dual actuator assemblies. One of the pistons of the present actuator includes a rod which is connected to a load. The other piston rod is parallel to the first and is connected through articulated means or a scissor linkage arrangement to the actuator cylinder so as to take up the reaction torque of this piston rod and prevent rotation thereof. This linkage also helps to maintain fixed parallel relationship and alignment of the cylinders with respect to each other.

Further objects and advantages of the present invention will be apparent from the following description, reference being had to the accompanying drawings wherein a preferred embodiment of the present invention is clearly shown.

In the drawings:

Figure 2 is a perspective view of a fragmental cross-section along line 2—2 of Figure 1 of the subject actuator.

Figure 1:
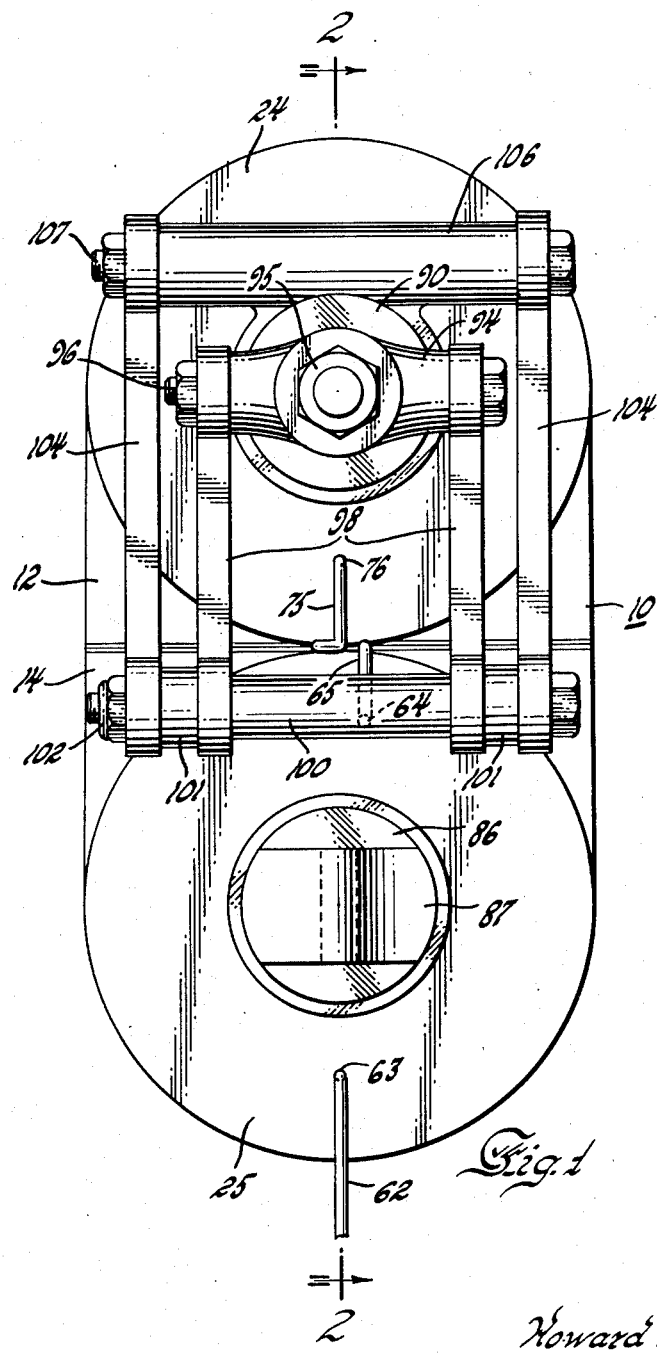
Figure 1 is an end elevational view of the parallel arrangement of dual fluid pressure actuators showing relationship of cylinders and the linkage arrangement in the present invention.

With particular reference to Figure 1, an actuator assembly designated by the numeral 10, is shown including upper and lower actuator portions. Figure 2 shows a partially sectioned perspective view of this actuator including an upper housing 12 and lower housing 14 disposed in fixed parallel relation to one another. A suitable fixture 16 is formed integral with the lower housing and is formed with an aperture 17 permitting pivotal connection through a pin 18 to a fixed support 19 for these dual housing portions. Each housing has an internally threaded portion 20 and 21, respectively, for threaded engagement with one end of cylinders 22 and 23, respectively. The other end of each of the cylinders is threaded to engage internal threads of an end cap assembly 24 and 25, respectively, for each cylinder. Gaskets 26 are disposed in annular grooves provided in each end cap assembly and the upper and lower housings to provide a fluid seal between these members and the cylinders 22 and 23 threaded into engagement as just described.

A piston 28 having a head portion 29 and rod end portion 30 is reciprocally disposed in the cylinder 22 dividing it into a retract chamber 31 and an extend chamber 32. Similarly, a piston 34 having a head portion 35 and a rod end portion 36 is reciprocally disposed in cylinder 23. The head portions 29 and 35 of each of these pistons are formed with an annular groove for receiving a ring assembly 37 providing a fluid seal between the cylinders 22 and 23 and pistons 28 and 34, respectively.

For purposes of illustration, the lower piston 34 has been cross-sectioned in Figure 2 showing a non-rotatable nut 38 rigidly connected through threads 39 with the piston 34. The nut 38 is provided with conventional internal threads operatively engaging a rotatably journalled element or screw shaft 40 through the agency of a plurality of balls (not shown). A conventional circulating return path 41 for these balls is shown disposed on the nut 38. The screw shaft 40 is rotatably journalled in the lower housing 14 by means of bearings 42. A similar screw shaft 44 is rotatably journalled by bearings 45 in the upper housing 12. The nut and piston assembly operably connecting screw shaft 44 with piston 28 is similar to that described for the screw shaft 40 and piston 34. The bearings 42 and 45 are retained in assembled relationship with the upper housing 12 and lower housing 14, respectively, by means of spacers 46 and 47 snugly fitted against an internal shoulder portion of the lower and upper housings when the cylinders 22 and 23 are threaded to these housing members as described above. Nuts 48 and 49 are fitted to a threaded portion of the screw shafts 40 and 44, respectively, also serving to retain the bearings 42 and 45 in position.

As shown in Figure 2, each screw shaft is fitted with bevel gears 50 and 51, respectively, each of which meshes with the following gearing mechanism. Rotatably journalled by bearings 52 in an axis transverse to the axes of the parallel cylinders 22 and 23 is a shaft 53 disposed with a pair of bevel gears 54 and 55 meshing with the bevel gears 50 and 51, respectively, on the screw shafts as just described. The shaft 53 is surrounded by a lubricating packing. The packing is spaced between the shaft 53 and the upper housing 12 and lower housing 14 by means of a transfer pilot sleeve 56 disposed with annular grooves for receiving O-ring seals 57 serving as a seal between the sleeve 56 and each of the housing members. The packing comprises a seal retainer 58 which clamps a V packing 59 between an intermediate V adapter ring 60 with a symmetrically disposed packing and seal retainer not visible on the perspective view of Figure 2. The transfer pilot sleeve serves an additional purpose of locking the upper housing 12 and lower housing 14 together such that they remain in parallel axes without possibility of relative axial movement between either the fixed support 19 or cylinders 22 and 23 with respect to each other. The gearing 50, 51, 54 and 55 is so arranged that rotation of screw shaft 40 causes rotation of screw shaft 44 in an opposite direction.

Due to the opposite rotation of screw shafts 40 and 44, the pistons 28 and 34 are caused to move in opposite directions. Thus, the head portion 29 of piston 28 is moving to the right as viewed in Figure 2 when the head portion 35 of piston 34 is moving to the left. Similarly, the rod end 30 of piston 28 is moved axially to the right in cylinder 22 while the rod portion 36 of piston 34 moves axially to the left in cylinder 23, because each of the pistons is operably connected to the screw shafts 40 and 44 by a nut such as 38 and the screw shafts, in turn, are interengaged by the gearing 50, 51, 54 and 55. Each of the pistons 28 and 34 is moved simultaneously when fluid pressure is supplied to either the retract chamber 31 or the extend chamber 32 depending upon the direction of movement desired. Due to this simultaneous movement, it may be noted that in the lower cylinder 23, the piston 34 divides the cylinder into an extend chamber 32' located adjacent the head portion 35 of piston 34 compared with the retract chamber 31 located adjacent the head portion 29 of piston 28. Similarly, the retract chamber 31' formed in cylinder 23 is adjacent the rod end 36 of piston 34 compared with the extend chamber 32 located adjacent the rod end 30 of piston 28. The retract chambers 31 and 31' are supplied with fluid pressure through ports which may be supplied from a single conduit 62. This conduit 62 supplies a port 63 in the lower end cap assembly 25 communicating with the retract chamber 31'. A port 64 is further provided in the end cap assembly connecting through a conduit 65 to a port 66 disposed in the upper housing communicating with an annular channel 67 disposed in the spaced 46 mentioned earlier. The annular channel 67 communicates with the retract chamber 31 of cylinder 22 through an aperture 68 as shown in Figure 2.

The extend chambers 32 and 32' are supplied with pressurized actuating fluid through a conduit 70 communicating through an aperture 71 in the lower housing 14 which connects with an annular space 72 of spacer 47 described earlier. An aperture 73 connects the space 72 with the extend chamber 32' which, in turn, is interconnected with the extend chamber 32 of cylinder 22 by means of an aperture 74 of lower housing 14 communicating through a conduit 75 with a port 76 disposed in the end cap assembly 24. Thus, actuating fluid pressure may be supplied to either the extend or retract chambers simultaneously causing reciprocal movement of pistons 28 and 34 in opposite directions.

The arrangement of extend and retract chambers just described provides a feature permitting equal fluid pressure to be applied for actuation in either direction. The total effective areas required to actuate the two pistons is equal in both direction because the total combined areas of the two pistons comprises the rod end of one piston together with the head end of the other piston and vice versa in accordance with the location of the extend and retract chambers as described.

The rod end 36 of piston 34 protrudes through an end aperture 78 in end cap assembly 25. A packing 79 held in position by a ring 80 provides a seal between the rod end 36 of the piston 34 and end cap assembly 25. The rod end 30 of piston 28 protrudes through an aperture 82 in end cap assembly 24 with a packing 83 held by a ring 84 providing a similar seal between the rod end 30 and end cap assembly 24. The rod end 30 is disposed with a tube assembly 86 provided with a flange 87 apertured to receive a pin 88 operatively engaging the tube assembly with a fitting 89 which may be connected to a suitable load or control surface. Attaching the tube assembly to the load prevents rotation of the rod end 36. The pistons 28 and 34 cooperate through the screw shafts 40 and 44 and the gearing described in conjunction therewith to reciprocate the rod end 30 for moving the load in accordance with fluid pressure actuation supplied to the extend or retract chambers described for each of the cylinders above.

The rod end 30 of piston 28 protrudes through the aperture 82 of end cap assembly on the same side and in a manner similar to the rod end 36 of piston 34. However, rod end 30 of the upper piston is not connected to the load and, therefore, is subject to useless rotation and unwanted reaction torque during actuation of the pistons. Therefore, the rod end is connected through an articulated means, or scissor linkage arrangement, to the end cap assembly 24 for the cylinder 22. A tube assembly 90 is fitted to the rod end 30 and is provided with a splined axial portion 92 and a threaded portion 93. An adapter yoke 94 is provided with internal splines which opertively engage the splined portion 92 of the tube assembly 90 and is retained in assembled relationship therewith by a nut 95 threaded onto the portion 93 of the tube assembly 90. The adapter 94 is disposed with a bolt and nut assembly 96 providing a pivot or articulated juncture between the adapter 94 and a pair of downwardly extending members or lower arms 98 which are held in spaced parallel relationship to each other by means of a spacer sleeve 100 disposed parallel to the axis of the bolt and nut 96 of adapter 94. A pair of washers 101 are disposed axially with the spacer sleeve 100 as shown in Figure 1. The spacer sleeve 100 is disposed with an extending nut and bolt assembly 102 providing a pivot for a pair of upwardly extending members or upper arms 104 which, in turn, are pivoted with respect to a block portion 106 attached to the end cap assembly 24. A nut and bolt 107 provide the pivot for upper arms 104 with respect to block portion 106.

The upper and lower arm arrangement, shown most clearly in Figure 1, articulated in the manner described, provides, in effect, a scissor linkage which permits linear axial movement of the rod end 30 of piston 28 in accordance with the movement resulting from actuation in one direction or another. Furthermore, the linkage prevents rotation of the rod end 30 of piston 28 and also serves to absorb the reaction torque occurring during actuation of the piston members. The linkage also helps maintain parallel alignment of the axes of the cylinders. The parallel arrangement of the cylinders with an upper and lower housing held in fixed relation on one end exclusively, permitting movement of the rod ends of the pistons through apertures on the opposite end exclusively, permits reciprocating movement of the assembly to be limited to protruding portions on one side only so that the parallel arrangement of the dual fluid pressure actuators may be effected in a minimum mounting space.

While the embodiment of the present invention as herein disclosed constitutes a preferred form, it is to be understood that other forms might be adopted.

What is claimed is as follows:

1. An actuator assembly, comprising a pair of stationary cylinders disposed parallel to each other, a reciprocal piston in each cylinder, a pair of screw shafts rotatably journalled axially in each cylinder, a nut operatively connecting each screw shaft with its piston in respective cylinders, gearing means interconnecting said screw shafts to cause opposite rotation thereof with respect to each other, means connecting one of said pistons to a load, means connecting the other of said pistons to one of said cylinders to prevent rotation thereof, and means maintaining said pair of cylinders mounted in fixed parallel relationship to each other.

2. A mechanism for actuating control surfaces, comprising, dual fluid pressure actuators fixedly disposed parallel to each other, gearing means operably interconnecting said actuators to effect actuation thereof in opposite directions so that the torque of said actuators is added to actuate said control surfaces, means for connecting one of said actuators to said surfaces, and means disposed with the other of said actuators to take up reaction torque thereof, said mechanism being adapted for use in limited mounting space.

3. The combination comprising, dual casings fixed parallel to each other, a reciprocal piston disposed in each casing, an element rotatably journalled in each casing and operably connected to each piston, means interconnecting said elements to effect opposite rotation thereof with respeect to each other, means for connecting one of said pistons to a load, means for connecting the other of said pistons to one casing effecting absorption of reaction torque and preventing rotation thereof, and fluid pressure supply lines interconnecting chambers in said casings on opposite sides respectively of said pistons such that the sum of the respective piston areas effecting actuation in either direction is equal.

4. A fluid pressure actuator mechanism, comprising, in combination, dual cylinders fixedly disposed parallel to each other, a reciprocal piston disposed in each of said cylinders, a rotatably journalled element operably engaged with each piston, gearing serving to interconnect each element for rotation in opposite directions with respect to the other, means for connecting one of said pistons to a load, a piston rod assembly connected to the other of said pistons, and a scissor linkage interconnecting said assembly with one of said cylinders for absorbing reaction torque and preventing rotation thereof.

5. A parallel arrangement of dual fluid pressure actuators comprising in combination, a pair of cylindrical casings fixedly disposed parallel to each other, a piston reciprocally disposed in each of said casings, means operably interengaging said pistons for movement in opposite directions, a piston rod operably connected with each piston extending in parallel relationship through end apertures of each actuator, said rods protruding from ends adjacent to each other and opposite to the ends where the casings are fixedly disposed, one of said rods being adapted for connection to a load, an adapter assembly connected to the other of said rods, and a pivotal linkage connecting said adapter assembly to one of said casings permitting axial reciprocal movement of said assembly with absorption of reaction torque to prevent rotation thereof.

6. A dual fluid pressure motor for use in limited mounting space, comprising, in combination, cylinders disposed in fixed parallel relationship to each other, a piston dividing each cylinder into a retract and extend chamber, respectively, means operably interengaging said pistons to effect movement thereof in opposite directions with respect to each other, a piston rod operably connected with each piston and protruding through an aperture in an end of each of said cylinders adjacent the apertured end of the other, means including an articulated linkage connecting one piston rod with one of said cylinders to absorb reaction torque and prevent rotation thereof, and means for connecting the other piston rod to a load, said retract and extend chambers being so disposed that the total actuating piston surface exposed to fluid pressure required for movement in one direction is equal to that required for movement in the other direction.

7. An actuating apparatus including, in combination, cylindrical casings mounted in fixed parallel relationship, a piston having a head portion and rod end reciprocally disposed in each of said casings, a separate screw shaft rotatably journalled in each casing and operably connected with each respective piston, means rotatably journalled normal to the axes of said screw shafts for interconnecting said shafts to rotate in opposite directions, means including a scissor linkage operably connecting the rod end of one piston with a casing so as to absorb reaction torque and prevent rotation thereof, and means for connecting the rod end of the other piston with a load, the total combined areas for moving the pistons in opposite directions during actuation being equal in both directions.

8. Apparatus for use in limited mounting space for actuating control surfaces, comprising, a pair of parallel piston assemblies reciprocal in opposite directions, a head portion of each piston facing in the same direction, a piston rod portion of each piston extending in a direction opposite to said head portion, a joined casing extending axially about each piston forming retract and extend chambers on either side of each of said pistons, said casing being adapted to be held in fixed relationship, connecting means operably disposed between said pistons to permit movement thereof in opposite directions, means articulated between a piston rod portion of one of said pistons and said casing for absorbing reaction torque and relative rotation thereof, and means for connecting the piston rod portion of the other piston to a load.

9. The apparatus of claim 8 including means whereby retract and extend chambers are structurally interconnected respectively such that the total combined area for moving the pistons in opposite directions during actuation is equal in both directions, said area including the sum of the rod end of one piston plus the head end of the other piston and vice versa.

10. A dual actuator assembly including in combination, a pair of cylinders, a reciprocal piston in each cylinder, an element rotatably journalled axially in each cylinder, a nut operatively connecting each element with its piston in respective cylinders, gearing means interconnecting said elements to cause opposite rotation thereof with respect to each other, means connecting one of said pistons to a load, means connecting the other of said pistons to one of said cylinders to prevent rotation thereof, and means maintaining said pair of cylinders mounted in fixed parallel relationship to each other.

References Cited in the file of this patent

UNITED STATES PATENTS

| Re. 19,992 | Erling | June 2, 1936 |
| 2,198,543 | Lauterbach | Apr. 23, 1940 |
| 2,722,102 | Pilch | Nov. 1, 1955 |